Oct. 28, 1952  C. E. THORP ET AL  2,615,841
OZONE GENERATION
Filed July 8, 1948  4 Sheets-Sheet 1

EFFECTIVE AREA — HIGH FREQUENCY MODULATION

EFFECTIVE AREA
EFFECTIVE AREA

EFFECTIVE AREA

INVENTORS
Clark E. Thorp
Gustaf Panula
BY
Pennie, Edmonds, Morton & Barrows,
ATTORNEYS Oct. 28, 1952 — C. E. THORP ET AL — 2,615,841
OZONE GENERATION
Filed July 8, 1948

INVENTORS
Clark E. Thorp
Gustaf Panula
BY
Pennie, Edmonds, Morton & Barrows
ATTORNEYS

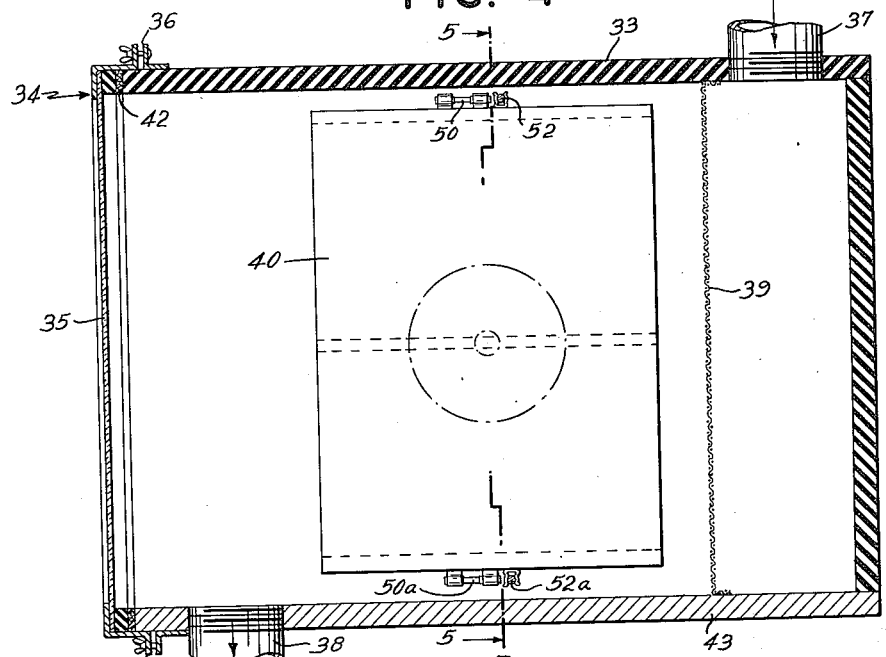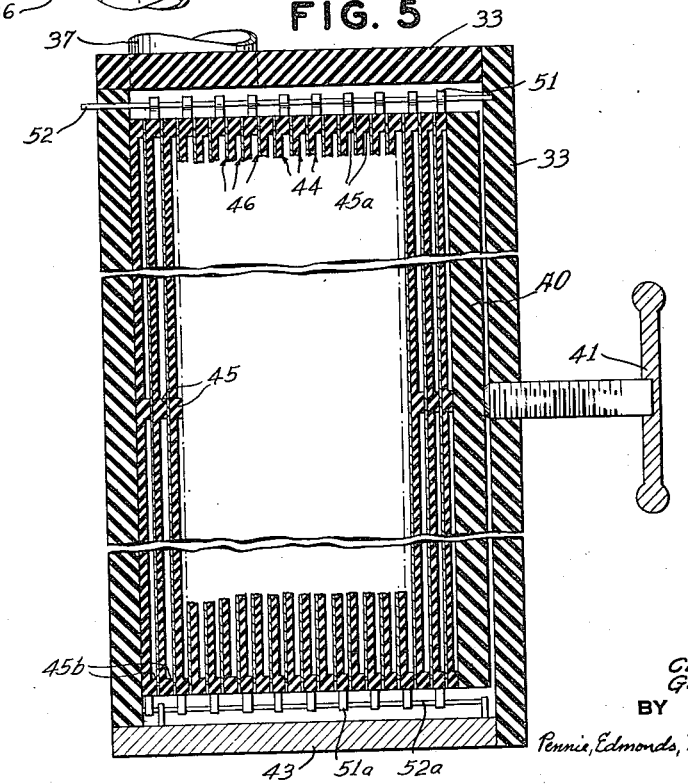

Oct. 28, 1952 C. E. THORP ET AL 2,615,841
OZONE GENERATION
Filed July 8, 1948 4 Sheets-Sheet 4

INVENTORS
Clark E. Thorp
Gustaf Panula
BY
Pennie, Edmonds, Morton & Barrows.
ATTORNEYS Patented Oct. 28, 1952

2,615,841

UNITED STATES PATENT OFFICE 2,615,841

OZONE GENERATION

Clark E. Thorp, Chicago, and Gustaf Panula, Midlothian, Ill., assignors, by mesne assignments, to Air Reduction Company, Incorporated, New York, N. Y., a corporation of New York Application July 8, 1948, Serial No. 37,730

7 Claims. (Cl. 204—176)

This invention relates to ozone generation and more especially to the generation of ozone by electric discharge through air or other gas or mixture of gases comprising or containing elemental oxygen.

The invention comprises a method and means whereby ozone may be generated with considerably greater efficiency than has heretofore been possible. This increase in efficiency is due to several improvements described hereinafter, but in general it is based on the discovery that if pulsating or alternating current is employed, only a small portion of each pulse or cycle need be utilized, and that the efficiency is related to the waveform of the energizing potential. Thus a considerable saving in power may be effected without decreasing the quantity of ozone generated.

In accordance with the present invention it has been discovered that the nature of the voltage (E) which is the peak voltage between electrodes, has an important relation to efficiency in ozone generation.

In the electrical sense, an ozone generator or ozonizer is an electrical condenser which is operated under partial breakdown conditions. Electrically it may be represented as an electrical condenser and a resistor in series. For general purposes of calculation such treatment is permissible, although actually the condenser does not pass current directly, but allows it to pass only by storage and subsequent discharge, as is well known. If direct current is applied as the source of potential (E) in constantly increasing magnitude to an ozonizer designed to operate at, say, 10,000 volts R. M. S., no discharge will occur at 10,000 volts or at the peak voltage, which is equivalent to approximately 14,250 volts. In fact, experiments have shown that no discharge will take place until dielectric breakdown occurs, which in the mentioned case was 32,000 volts. Under such high potential, dielectric breakdown consists in actual puncture and destruction of the dielectric material rendering it useless. Such performance is typical of electrical condensers, viz., they will pass alternating or pulsating current but not direct current. Therefore, direct current is not suitable for ozonizer operation. In connection with the following description of the invention it may be assumed, for convenience, that the power supply for the energizing current is of the usual alternating 60 cycle commercial type.

The operation of the ozonizer when energized by alternating pulses or current may be described as follows: On the first half cycle electrons collect on the surface of the positive dielectric. On the second half cycle these electrons flow across to the opposite dielectric, and in colliding with gas molecules existing in the intervening gap liberate additional electrons. This process is repeated for several cycles until electron saturation or equilibrium is established, after which the electron density is constant. These electrons flow back and forth from one dielectric surface to the other as the cycles of energizing potential alternate the polarity of the electrodes. Under the mentioned conditions a minimum time is required with each reversal of polarity for the electrons to leave one dielectric surface and pass to the opposite dielectric surface. From this it can be seen that the chance of achieving collision between electrons and gas molecules is greatly increased by reversing the polarity periodically, and it also explains why a minimum time, viz., pulse duration, is required for substantially all of the electrons to pass from one dielectric to the opposite dielectric.

The manner in which the invention may be carried out will be understood by reference to the following description considered in connection with the drawings, wherein:

Figs. 1a to 1f, inclusive, represent several types of waveforms of energizing voltage, illustrating the principle of the invention;

Fig. 4 is a side elevational view, partly in section, of an ozonizer in accordance with the invention;

Fig. 5 is a sectional view of the ozonizer taken along the line 5—5 of Fig. 4;

Figure 1A:
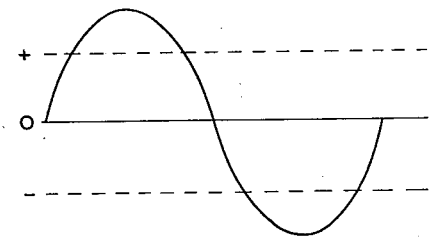
Figure 1B:
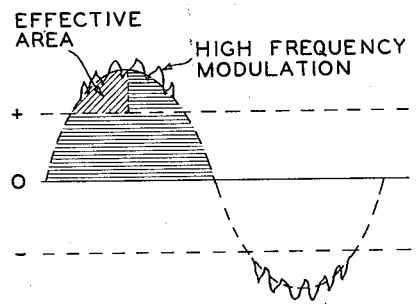

Referring now to the first sheet of drawings, Fig. 1a illustrates a sine wave which, at least theoretically, represents the form of energizing voltage employed in commercial ozonizers heretofore employed. The dotted horizontal lines marked (+) and (−) represent the root mean square (R. M. S.) voltage which is 0.707 times the peak voltage. In most ozonizers the design is such that the discharge does not begin to occur until the voltage has reached a minimum value sufficient to overcome the dielectric strength of the gaseous medium between the dielectric which separates the metallic electrodes. This voltage is usually the mentioned R. M. S. value. We have discovered that the area of the wave between the zero axis (Fig. 1a) and the value of R. M. S. voltage represented by the dotted horizontal lines is, generally speaking, non-effective in producing ozone. In Fig. 1b this ineffective area is shaded by horizontal lines. We have also discovered that the generation of ozone is greater as the rate of change of voltage becomes greater, and further that there is an optimum duration of voltage pulse in respect to ozone generation efficiency. For example, we have found that a wave or pulse of steep front is more effective than one having a small rate of change, and that only a small portion of the voltage wave is effective in generating ozone. In other words, for the most efficient operation, the voltage wave should have a duration of between 10 and 200 microseconds, and preferably between 100 and 200 microseconds, per 0.3 cm. of air gap between electrodes. As an optimum, a pulse duration of approximately 120 microseconds has been calculated, and substantiated by practice, to produce the most ozone per watt of power consumed, more especially at approximately 4,000 volts per centimeter of air space between electrodes.

The portion of the voltage wave most effective in generating ozone is represented in Fig. 1b by the area or sector sectioned in lines at substantially 45° to the horizontal. The corresponding portion of the negative half-cycle is equally effective, although it is not specifically illustrated. Due to the capacitance effect of the ozonizer dielectric, higher resonant frequencies are usually generated and these high-frequency modulation waves are superimposed on the peak portions of the wave as illustrated in Fig. 1b.

Figure 1C:
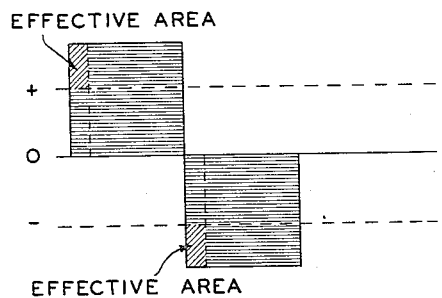

It has been stated above that ozone production increases with an increase of rate of change of voltage, especially with rising voltage. Hence it follows that a wave or pulse of square form viz., having straight sides perpendicular to the zero axis, rather than of sinusoidal form having curved sloping sides, should be more effective. This, in fact, has been demonstrated to be true, and consequently a first approach to the ideal waveform comprises a square shaped pulse, viz., a straight sided pulse as shown in Fig. 1c, of which, as before, the effective area comprises that portion of the pulse above the R. M. S. voltage value, both plus and minus, of optimum duration. Thus, further approaching the ideal, all of the area within the square wave (Fig. 1c) to the right of the vertical dotted line between maximum voltage and zero might be eliminated, with considerable saving in electric power, without decreasing the ozone generation. This improvement will result from use of the voltage pulses of short duration illustrated in Fig. 1d, which represents a series of voltage pulses of rectangular form, of optimum duration, spaced apart in regard to the time axis, and of alternating polarity. The pulse duration can be shortened by increasing the frequency of the electric power source, but this also increases the power consumption because the current passing through a capacitance is proportional to the frequency. Therefore, under ordinary conditions, increasing the frequency alone, while it may increase the ozone yield, does not increase the efficiency because the power consumption increases in the same or greater ratio.

In accordance with the invention, an increased yield of ozone without increase in current and, in fact, usually with decrease in current, is achieved by generating voltage of the desired form and duration of wave or pulse and, by employing it to energize an ozonizer, preferably of improved construction also according to the invention.

Pulses of short duration which may be employed to produce a greater yield of ozone in the manner of the invention may be obtained in several different ways. A very simple means comprises the use of a pulsing or saturating core transformer, which is a device well known in the electrical art. Pulsing transformers are designed so that the magnetic flux is increased to saturation in, say, each first quarter cycle of each reversal of the sine wave. Such saturation causes the output of the transformer to decrease rapidly when the peak voltage is reached, producing a waveform similar to that shown in Fig. 1e. If the pulsing transformer is designed for the intended installation, an effective voltage peak of comparatively short duration will result, with consequent yield of more ozone per watt of energy than would be the case if the ozonizer were energized by a sine wave such as illustrated in Fig. 1b. As a practical matter it has been found that the resulting order of magnitude of improvement may be expected to be by a factor of more than 7.

Figure 1D:
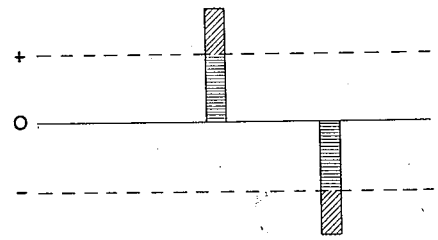
Figure 1E:
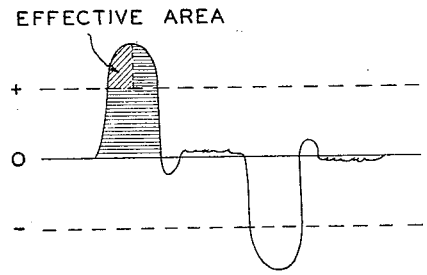
Figure 1F:
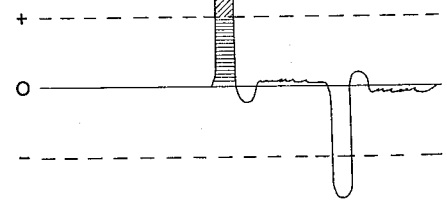
Figure 2:
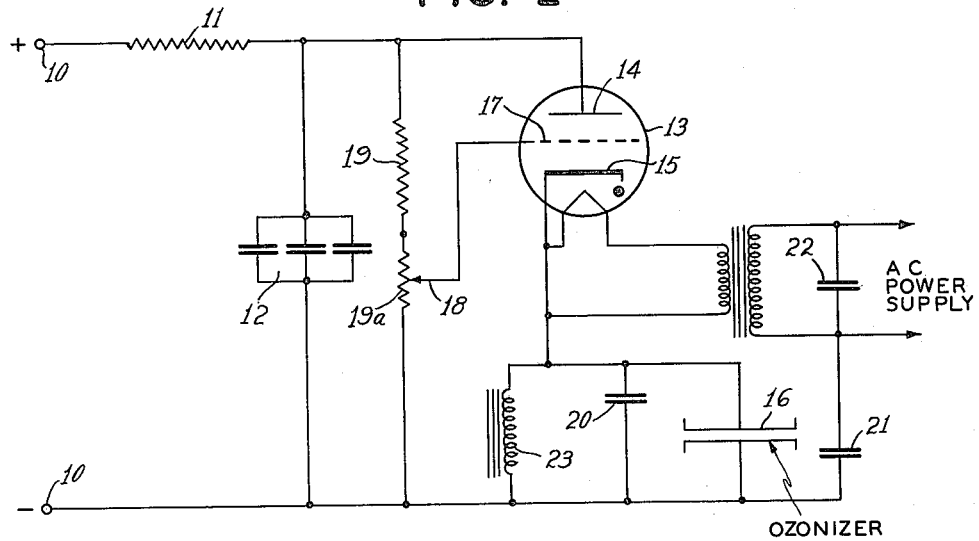
Fig. 2 is a circuit diagram of a pulse generating circuit.

A more nearly ideal pulse for the present purpose may be obtained electronically by an oscillator of the nature shown in Fig. 2, for example. In this system the initial source of potential is high-voltage direct current of say 12,000 volts, or more, applied to the terminals 10, 10, through resistor 11, to a bank of condensers 12 where it is accumulated until a sufficiently high potential is built up. A gas-discharge tube 13 of suitable high-voltage type is connected in the circuit with its anode 14 connected to the positive side of the condenser bank. The cathode 15 of tube 13 is in turn connected to one terminal of the ozonizer 16, the other terminal of the ozonizer being connected to the negative terminal of the condenser bank 12. Since grid 17 of the tube 13 is connected through a variable contact 18 to the grid resistor 19a, any desired potential may be impressed on grid 17 because the terminals of resistors 19, 19a, are, as shown, connected across the condenser bank 12. When tube 13 fires, the high voltage from condenser bank 12 will be applied across the electrodes of ozonizer 16. Repetition, pulse rate and alternate inversion of polarity may be adjusted by selection of appropriate values of the components in the time constant networks which include condensers 20 and 21, inductance 23 and resistors 19, 19a. The pulses generated by the system of Fig. 2 are illustrated in Fig. 1f, and are seen to conform quite closely to the ideal waveform illustrated in Fig. 1d. Pulses of this nature when applied to a suitable ozonizer, such as hereinafter described, result in improved efficiency of ozone yield by a factor of the order of 15, as compared with the efficiency resulting from energization by a sine wave, as shown in Fig. 1b.

It will be noted that the duration of the pulse represented in Fig. 1f is slightly less than the duration of that shown in Fig. 1d. As a matter of fact under the conditions under which the system of Fig. 2 was employed to generate the pulses of Fig. 1f, the pulse duration was about 10 microseconds, which, at the voltage of 15,000 volts (peak) was slightly too short to yield maximum ozone per watt of electric power. If the pulse is of too short duration, the electrons will not attain sufficient kinetic energy. These discrepancies can be compensated for by increasing the force or potential acting on the electrons, but as has also been pointed out, there is a limit to the maximum potential which is set by the dielectric strength of the dielectric material in the ozonizer. By increasing the pulse duration to about 100 microseconds the same yield could be obtained at about 12,000 volts.

To permit the construction of a pulse generating system in accordance with Fig. 2, the following values of circuit elements are given entirely by way of example and not by way of limitation, it being understood that those skilled in the art would be expected to vary the values thereof and modify the connections to suit the requirements in particular cases.

| | |
|---|---|
| Condensers 12 | 0.75 mfd. |
| Condenser 20 | .001 mfd. |
| Condenser 21 | .01 mfd. |
| Condenser 22 | .01 mfd. |
| Resistor 11 | 1 megohm |
| Resistor 19 | 10 megohms |
| Resistor 19a | 0.5 megohm |
| Inductance 23 | 10 millihenries |
| Tube 13 | Type 4C35 (Hydrogen Thyratron) |

Experimental results have indicated that the ozone yield under the assumed conditions is greater with a pulse duration somewhat more than 100 microseconds, although, as above stated, the maximum yield with minimum power consumption appears to be achieved with a pulse duration of approximately 120 microseconds under those conditions. Tests show that a variation of about 5 microseconds above or below 120 does not change the yield appreciably. For example, an increase of ozone yield by a factor of 18.7 over that of a standard ozonizer energized by a sine wave was obtained with a pulse duration of 125 microseconds.

Figure 3:
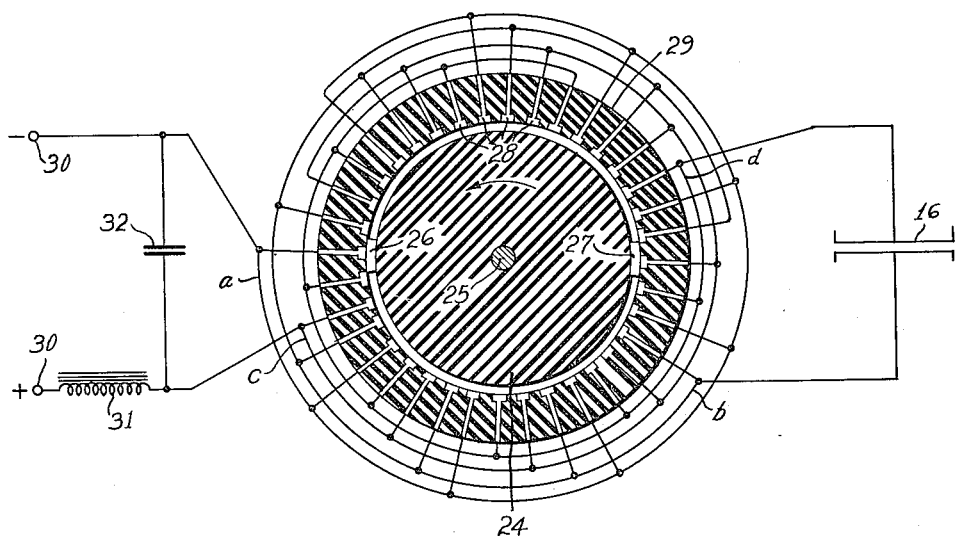
Fig. 3 is a schematic diagram of an electromechanical square wave generator.

A practical and simple means for developing pulses of between about 100 and 200 microseconds (which is the preferable range for ozonizers of the nature below described) is shown in Fig. 3. to consist essentially of a rotary switch which interrupts a suitable direct-current potential. This rotary switch may be constructed in any suitable manner, and one example is illustrated in the drawing. In this device, rotor 24, of suitable high-voltage insulating material, is supported on and is driven by a shaft 25. The rotor carries two brushes, 26 and 27, each of which should be long enough to make connection with only two adjacent stationary contacts simultaneously. The brushes are not connected together, and are located symmetrically at the extremes of a diameter of the rotor. The stationary contacts 28 are shown to be spaced at equal distances around the inner surface of an insulating supporting ring 29 which may be of the same material as the rotor. These contacts 28 are connected together in four separate groups. The contacts of each of these groups are interconnected by connecting buses a, b, c and d, respectively, and the contacts are arranged in repeated sequence: a, b, c, d in the direction in which the rotor turns. A high-voltage direct-current source of, say, 15,000 volts is connected to the input terminals 30. A suitable filter comprising inductance 31 and capacitance 32 are connected, as shown, to the power source. The values of these elements would probably be changed under other conditions, but those here specifically referred to comprise an inductance of 5 henries and a capacitance of 10 microfarads. If the direct-current source is connected to the bus bars a and c, and the ozonizer 16 is connected to bus bars b and d, pulses of substantially square form and of alternating polarity, as illustrated in Fig. 1d, may be generated. The frequency of reversal, as well as the pulse duration, will depend upon the speed of rotation of the rotor 24. In this case the frequency may be assumed to be 400 cycles per second and the pulse duration about 125 microseconds.

The construction of an ozonizer in accordance with the invention is illustrated in Figs. 4–8, inclusive. Referring to Figs. 4 and 5, the ozonizer includes a housing 33 forming a gas-tight container of rectangular shape. The bottom piece 43 of the housing may conveniently be of suitable metal such as aluminum, which may be grounded. Preferably one wall comprising the front is formed as a removable door 34 which includes a panel 35 of suitable transparent material such as heavy glass, permitting observation of the interior of the housing, and especially of the electrode plates during operation. This door 34 may be removably secured to the remainder of the housing by wing-nut clamps 36. To make the door gas-tight a suitable gasket 42 may be employed. At opposite ends and opposite sides of the housing gas inlet pipe 37 and outlet pipe 38 pass through the walls to permit the flow of air into the ozonizer and to conduct the resulting ozone out of the ozonizer. Across the inlet end of the housing a screen 39 of metal or other suitable material is secured to filter the incoming air. The chamber formed on the opposite side of screen 39 is large enough to accommodate the elements or electrodes of the ozonizer, which in their assembled form are shown in Fig. 4 and Fig. 5. The electrode plates are preferably forced together under pressure, and for this purpose a heavy insulating plate 40 (Fig. 5) is placed at one end of the stack of plates, and against this insulating plate the necessary pressure is applied by means of a screw and hand wheel 41. By employing a screw of proper length, the desired pressure may be applied to any number of electrode plates in accordance with the requirements. A better understanding of the construction of the electrode plates and the manner of assembling and connecting them will be had from a consideration of Figs. 6, 7 and 8.

Figure 6:
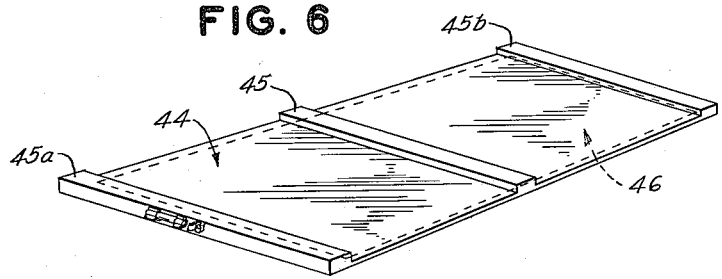
Fig. 6 is an isometric view of one of the electrode plates represented in Figs. 4 and 5.

Fig. 6 illustrates one of the electrode plates which comprise the active elements of the ozonizer. It consists of a backing element 44 and a conducting plate 46. The backing element is of insulating material which may be formed by a molding or other process, and comprises a flat portion having thicker reinforcing ribs 45, 45a and 45b, extending across the element. These ribs also serve as spacers to provide the correct air gaps between the electrodes. Along the smooth side of the backing element the electrode 46 is secured. This may conveniently comprise metal foil which in the drawing is represented to be of greater thickness than would probably be necessary. In a typical case this foil was about 60 square inches in area, and the thickness of the air gap about 0.3 inch. About seventeen such elements make a convenient unit.

Figure 7:
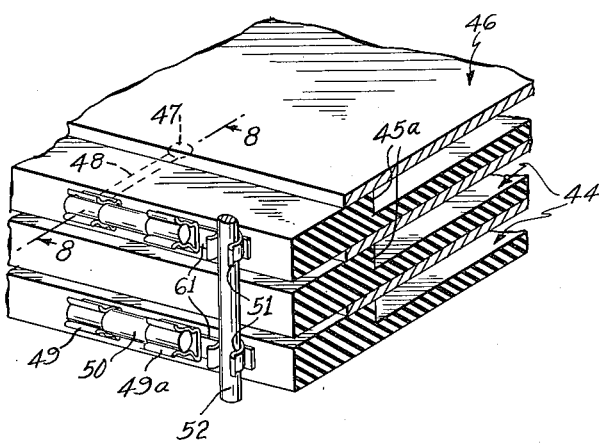
Fig. 7 illustrates in an isometric view of which the end is in section, the manner of assemblying and connecting the plates of the ozonizer.
Figure 8:
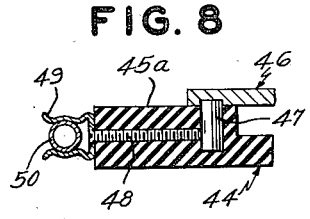
Fig. 8 shows means for making electrical connections to the electrode plates, being a sectional view taken along the line 8—8 of Fig. 7.

Electrical connections to the plates may conveniently be made in the manner illustrated in Fig. 8. A metal rivet or plug 47 is imbedded in the backing element 44 with the head thereof protruding slightly so as to make electrical contact with the bottom surface of the electrode plate 46. A screw 48 is then inserted from the end of the element until it contacts rivet 47. Under the head of screw 48 a U-shaped metal fuse clip 49 is secured so that the connection from the plate includes rivet 47, screw 48, clip 49, fuse 50 and a second fuse clip 49a (Fig. 7). Electrically connected to fuse clip 49a by link 61 is another metal U-shaped spring clip 51 positioned at right angles to the fuse clips. By securing a connection bar 52 which may be of aluminum, for example, into clips 51 of alternate plates, as shown in Fig. 7, these plates will be held together and will be electrically interconnected. If the same arrangement of clips, fuses and connection bar is arranged at the opposite ends of the other set of elements they will also be supported and their plates interconnected. If the plates of the other set are preferably supported by the low-potential or grounded side of the system, and if they are also connected thereto it may not be necessary to fuse those plates. In the event that fuses 50a (Fig. 4) and fuse clips 51a be omitted, the connections to the electrode plates 46 may be made in the manner shown in Fig. 8, by a screw running from clip 51a to a rivet suitably connected to the electrode plate. In Fig. 5 the assembled plates are illustrated in place within housing 33, and from this figure it is clear that suitable high-potential connection may be made to bar 52 and low-potential connection may be made to the metal bottom piece 43, to which rod 52a is here shown to be connected.

Figure 9:
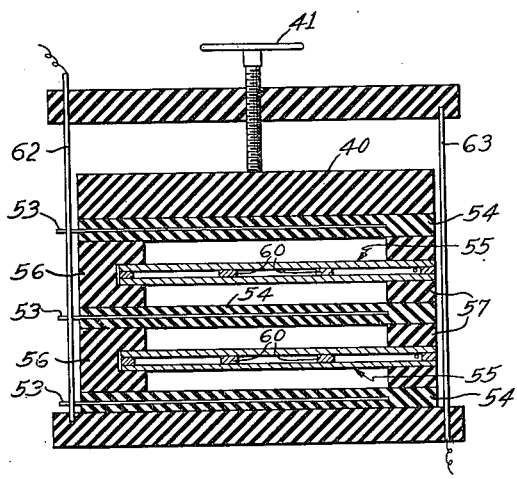
Fig. 9 is a vertical view in cross section of an ozonizer comprising a modification of the invention employing water-cooled plates.
Figure 10:
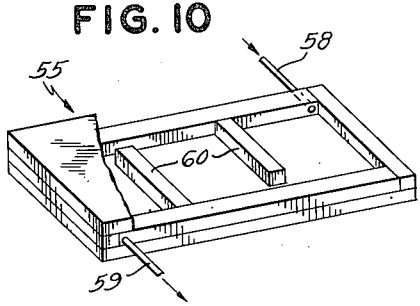
Fig. 10 is an isometric view partially cut away, illustrating the construction of one of the water-cooled plates of the ozonizer of Fig. 9.

An alternate modification of the ozonizer is shown in Figs. 9 and 10. This embodiment is somewhat similar to that of Figs. 4–8, inclusive, differing therefrom principally in having water-cooled elements. In Figs. 9 and 10 some of the details of the construction have been omitted, but such omitted components may be assumed to be similar to those illustrated in the preceding figures. In this arrangement the metal electrode plates 53, which are connected to the high potential side of the circuit, are covered on each side by a layer of insulating material, viz., they are imbedded in an insulating sheet 54. In the alternative, the plate may be interposed between two insulating sheets. Plates 53 should be as thin as practicable and should have a very smooth, flat, ozone-resisting surface. Water-cooled electrode plates 55 are spaced between the high-potential electrode plates 53. These water-cooled plates are supported by blocks of insulating material 56 and 57 which may suitably be of polystyrene, for example. This material may, in fact, be employed for all of the insulating material herein mentioned, although other insulating materials, such as high-potential Bakelite for example, are also suitable.

The construction of the water-cooled electrode plate is illustrated more clearly in Fig. 10 which shows it to comprise a hollow metal structure of which the center cavity is filled with water which flows in and out of water pipes 58 and 59. Baffles 60 cause the water within the cavity to circulate more evenly over the entire area. These plates are subject to deterioration and should, therefore, be carefully constructed. They may be built from sheet brass heavily cadmium plated. To form the assembly, water-cooled and non-cooled plates can be stacked in alternate layers as illustrated in Fig. 9, and then suitably pressed together by means of the screw and hand wheel 41 as before.

Experience shows that the question of heating is important in connection with ozone generation because the rate of ozone generation is inversely proportional to the temperature. Furthermore, ozone is more stable at low than at high temperatures, the decomposition of the ozone being, in general, proportional to the temperature. Consequently, if the ozonizer or the electrode plates thereof are not artificially cooled, as by means such as described in connection with Figs. 9 and 10, pre-cooling of the air passing into the ozonizer is desirable. Generally speaking, the temperature of the air should be low enough to prevent deterioration of the dielectric and of the electrodes, as well as to increase the efficiency of ozone generation.

The air, before being pumped or blown into the ozonizer, may be pre-cooled by use of a heat exchanger so that the same amount of heat is removed as will be generated by the ozonizer. In this event the relative humidity of the air should be maintained as low as possible, and in any case should not be permitted to exceed 90%. If commonly available insulating material is employed in the ozonizer it is advisable to limit the rise of temperature of the air such that the temperature does not exceed about 110° F. and preferably about half of that value.

In a typical installation employing an ozonizer as described in connection with Figs. 4–8, inclusive, the air from a power-operated blower passes through a water-cooled heat exchanger and then into the ozonizer inlet pipe 37. The air pressure within the ozonizer may effectively be maintained between 700 and 800 millimeters of mercury, and preferably at about 753 millimeters, or slightly more in the particular ozonizer herein described. High ozone concentration may be had by recirculating the output from pipe 38 (Fig. 4) back into the input as many times as necessary or by employing a plurality of ozonizers in series, or by both expedients. Upon recirculation, some decomposition of the ozone occurs, but nevertheless recirculation results in considerably greater ozone concentration than is attained by passing the air through the ozonizer but once.

Within limits, the ozone yield is proportional to the current density at the electrodes. Current density may be increased by increasing either the frequency, the voltage or the capacitance of the ozonizer. The practical frequency range lies between about 50 and 500 cycles per second. Under ordinary conditions the capacitance may be increased by employing elements having increased dielectric constant. As a practical matter the voltage is limited by the dielectric strength of the elements, 21,000 volts (peak) having been found to be a practical limit determined by available dielectric materials. It should be noted that increasing the current density results in an increase of heating which, in turn, requires the disposal of more heat. In some installations this may be a difficult or expensive problem depending, for example, upon the availability and temperature of the supply of cooling water. We have found that a current density of from about 0.045 to 0.06 milliampere per sq. in. of electrode comprises a practical range. For optimum efficiency the impedance of the transformer, or the equivalent, feeding the ozonizer with electric power should be effectively matched to the load because the power factor decreases with increased current density. By maintaining an impedance match the power consumed may be maintained at a minimum for a maximum ozone yield.

What we claim is:

1. The method of generating ozone with an ozone generator having electrodes separated by a gas space which includes successively impressing on said electrodes while passing oxygen through said gas space high potential voltage pulses characterized by an abrupt rise from minimum voltage to maximum voltage and an abrupt decrease from said maximum voltage to said minimum voltage and a substantially rectangular shape, each of said pulses having a predetermined time duration within the range of from 10 to 200 microseconds per 0.3 cm. of gas space between the electrodes.

2. The method of claim 1 in which the time duration of each of the pulses is between 100 and 200 microseconds.

3. The method of claim 1 in which each of the pulses has a time duration of about 120 microseconds and the pulses have a voltage in excess of the ionizing voltage of air between the electrodes.

4. The method of claim 1 in which the voltage pulses are of alternating polarity.

5. The method of claim 1 in which heat is extracted from certain of the electrodes so as to maintain the gas in said gap at a temperature effectively below the temperature of ozone decomposition.

6. The method of claim 1 in which heat is extracted from the gas within said gap at a rate such as to maintain said gas at a temperature effectively below the temperature of ozone decomposition.

7. The method of generating ozone with an ozone generator having electrodes separated by a gas space which includes successively impressing on said electrodes while passing oxygen through said gas space a series of uniformly-spaced, high-potential voltage pulses of alternating polarity characterized by an abrupt rise from minimum voltage to maximum voltage and an abrupt decrease from said maximum voltage to said minimum voltage and a substantially rectangular shape, each of said pulses having a predetermined time duration within the range of from 20 to 100 microseconds per 0.3 cm. of gas space between the electrodes and less than one-half the time duration of two consecutive pulses of opposite polarity.

CLARK E. THORP.
GUSTAF PANULA.

REFERENCES CITED

The following references are of record in the file of this patent:

UNITED STATES PATENTS

| Number | Name | Date |
|---|---|---|
| 1,162,415 | Steynis | Nov. 30, 1915 |
| 1,326,631 | Bayenk et al. | Dec. 30, 1919 |
| 1,570,209 | De Brey | Jan. 19, 1926 |
| 1,793,799 | Hartman | Feb. 24, 1931 |
| 2,072,917 | Woelflin | Mar. 9, 1937 |
| 2,127,229 | McRae | Aug. 16, 1938 |
| 2,290,376 | Marshall | July 21, 1942 |

FOREIGN PATENTS

| Number | Country | Date |
|---|---|---|
| 369,956 | France | Dec. 3, 1906 |

OTHER REFERENCES

"Ozone," Vosmaer, Van Norstrand Co., N. Y., 1916, pages 64, 68 and 69.

Transactions of the Electro-Chemical Society, vol. 84, 1943, pp. 83–93.